United States Patent [19]

Grant

[11] 4,266,320
[45] May 12, 1981

[54] FAUCET EXTENDER

[76] Inventor: Cary E. Grant, 1077 Coventry Dr., Lake Forest, Ill. 60045

[21] Appl. No.: 79,442

[22] Filed: Sep. 27, 1979

[51] Int. Cl.³ .............................................. E05B 1/00
[52] U.S. Cl. .................................. 16/114 R; 251/293; 74/511 R
[58] Field of Search ................... 251/293; 74/504, 557, 74/511 R; 16/115, 114 R

[56] References Cited

U.S. PATENT DOCUMENTS

| | | | |
|---|---|---|---|
| 935,856 | 10/1909 | O'Meara | 251/293 X |
| 1,111,865 | 9/1914 | Serrell | 251/293 |
| 1,211,332 | 1/1917 | Mehrings | 74/504 |
| 1,313,216 | 8/1919 | Dasen | 74/557 UX |
| 1,338,849 | 5/1920 | Adair | 74/504 X |
| 1,754,310 | 4/1930 | Ellenberger | 251/293 UX |
| 1,931,751 | 10/1933 | Brown et al. | 251/293 X |
| 2,509,426 | 5/1950 | Fransen | 251/293 X |
| 3,962,748 | 6/1976 | Michaels | 16/115 X |

FOREIGN PATENT DOCUMENTS 794265  4/1958  United Kingdom ..................... 251/293

*Primary Examiner*—Andrew V. Kundrat
*Attorney, Agent, or Firm*—Neuman, Williams, Anderson & Olson

[57] ABSTRACT

A faucet extender device is provided which includes an elongated extension member and a connection arrangement at one end thereof for coupling to the valve-operating shaft of a conventional faucet on the outside of a house. A handle is provided on the outer end of the extension member which may be supported through a vertical support member inserted into the ground. The length of the extension and support members are adjustable. The connection arrangement at the inner end of the extension member is arranged to be secured to a conventional disk type of faucet handle or to the square end of a faucet-operating shaft.

7 Claims, 6 Drawing Figures

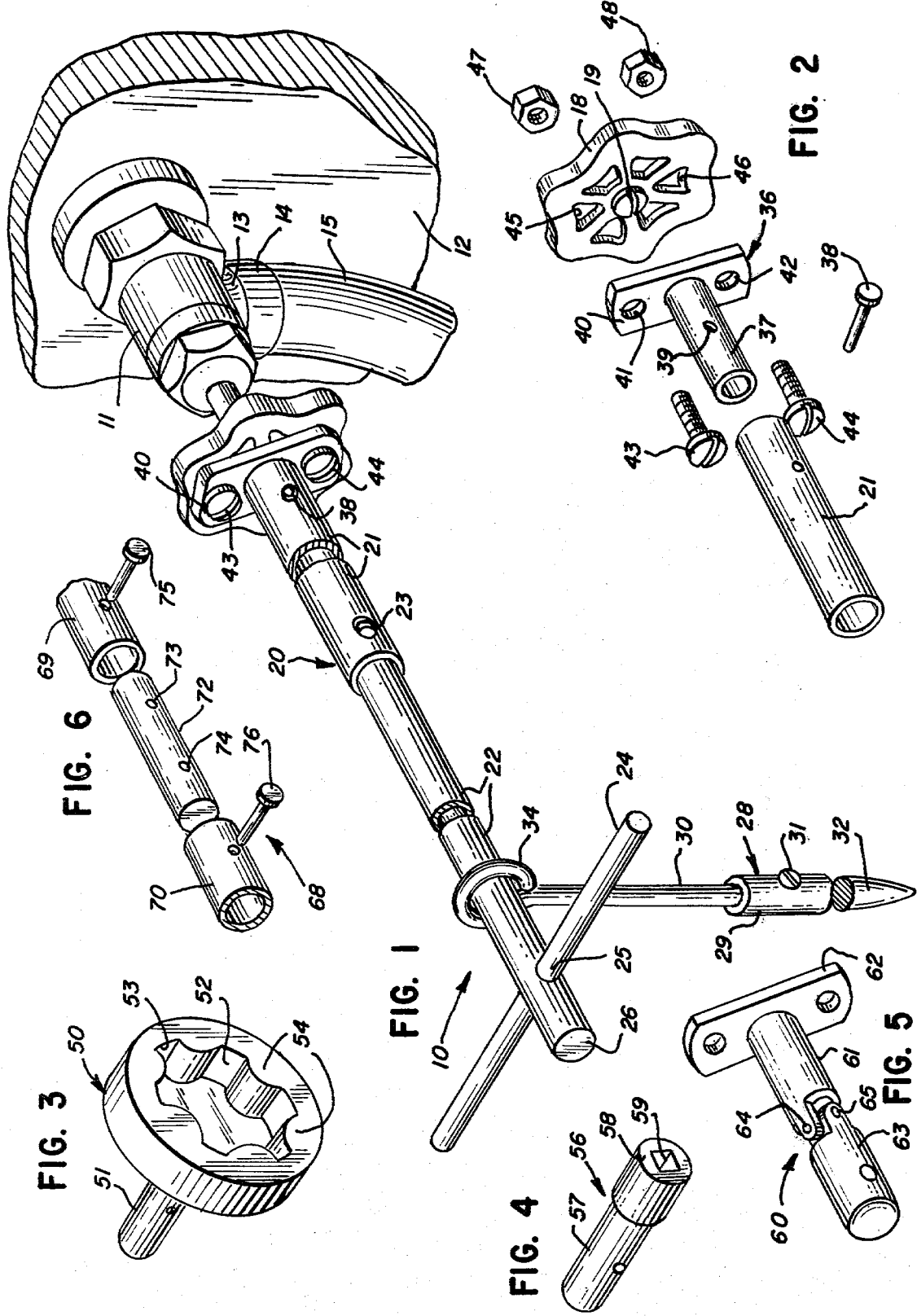

FAUCET EXTENDER

This invention relates to a faucet extender and more particularly to a faucet extender adapted to permit control of an outside faucet from a position spaced outwardly away from the side of a house. The faucet extender of this invention is relatively simple in construction and operation, is economically manufacturable and is readily installed. It is adaptable for use with different types of faucets.

BACKGROUND OF THE INVENTION

In a typical house of the type used for a single family residence, one or more faucets are provided on the outside for attachment to a fitting on the end of a garden hose. The owner of the house usually plants shrubs and bushes around the outside of the house and although the shrubs or bushes are initially so planted as to allow access to the faucet, they usually grow to an extent such as to make access to the faucet quite difficult. In many cases, the person trying to operate the faucet will be scratched from engagement with the shrubs or bushes. The problem has heretofore been handled by pruning back the shrubs or bushes to allow access to the faucet. This solution is not always satisfactory, however, because it requires the home owner to repeatedly prune back the shrubs or bushes as they continue to grow and very often, the required pruning is such that the symmetry of the bushes is destroyed and/or an unsightly gap in the shrubbery may occur. In some cases, the bushes or shrubs may be damaged by a person trying to reach a faucet or during pruning, to lead to disease thereof. Also, even though the bushes or shrubs may be pruned back, the possibility of being scratched from engagement therewith is quite real.

Another possible solution would be to relocate the faucet at a different position on the outside of a house or a position spaced outwardly from the house beyond the bushes or shrubbery. This solution, of course, is quite expensive.

The prior art has not recognized the possibility of operating a faucet from a position spaced outwardly therefrom, beyond bushes or shrubbery. Also, even if such a possibility were recognized, the prior art has not provided any devices which would be suitable for the purpose. The devices of the prior art which have been provided for operation of a valve from a distance away therefrom have been designed for specialized purposes such that they would not be suitable for use with a conventional faucet of the home type, without making substantial modifications. For example, the Drane, et al. U.S. Pat. No. 1,355,544 shows a device for operating the pet cock at the drain of a radiator of a model-T Ford car, but the device would not be suitable for a conventional home type faucet. Similarly, the Block U.S. Pat. No. 1,181,565 and the Bolkhardt U.S. Pat. No. 1,827,861 show devices for operating valves of hydrants or the like which are located at a considerable distance below ground, but such devices would not be suitable for the home type of external faucet.

SUMMARY OF THE INVENTION

This invention was evolved through a recognition of the problem with prior art procedures with the general object of overcoming the disadvantages thereof.

A specific object of the invention is to provide a device for allowing operation of a faucet without disturbing shrubbery adjacent thereto.

In accordance with this invention, a device is provided which includes an elongated extension member arranged to extend generally horizontally from an inner end adjacent a faucet on the outside of a house to an outer end which is outside bushes or shrubbery adjacent the house. The extension member is disposed in axial alignment with the conventional valve-control shaft projecting generally horizontally outwardly from the faucet, and connection means are secured to the inner end of the extension member for connection to the valve-opening shaft. At the outer end of the extension member, a handle is provided for engagement by the hand of a user for effecting rotation of the extension member and thereby the valve-operating shaft. With this comparatively simple arrangement, the faucet can be readily operated without disturbing the shrubbery and without danger of being scratched by the shrubbery.

In accordance with a specific feature, an elongated support member is provided which is arranged to extend vertically from a lower end adapted to be driven into the ground and an upper end which carries journaling means for supporting and journaling the outer end of the extension member. Thus, secure support for the extension member is provided. Preferably, the length of the support member is adjustable to facilitate alignment with the axis of the faucet shaft.

Another feature is in using an extension member which has an adjustable length, preferably with a telescoping connection of two or more members.

Further features relate to the provision of connection means for alternative use depending upon the type of faucet and the conditions of use. In one type of connection means, a pair of screws are disposed in spaced relation to and on opposite sides on the axis of the extension member and are adapted to extend through openings of a disk type of faucet handle, on opposite sides of the axis of the faucet shaft.

In another type of device, a connection member is provided having a recess for receiving a disk type faucet handle including radially inwardly projecting portions for extending between the usual lobes on the outside of the disk type of handle.

In still another arrangement, a connecting member is provided having a socket arranged to receive a polygonally shaped end of a socket shaft.

This invention contemplates other objects, features and advantages which will become more fully apparent from the following detailed description taken in conjunction with the accompanying drawings.

BRIEF DESCRIPTION OF THE DRAWINGS

FIG. 1 is a perspective view of a faucet extender device constructed in accordance with the principles of the invention and shown in installed relation to a faucet on the outside of a house;

FIG. 2 is a view similar to a portion of FIG. 1, but in the form of an exploded view illustrating the relationship of certain parts and the manner of connection thereof to a faucet handle;

FIGS. 3, 4 and 5 are views illustrating modified types of connector members; and FIG. 6 is a view illustrating a modified type of extension member.

Reference numeral 10 generally designates a faucet extender device constructed in accordance with the principles of this invention. The device 10 is shown in an installed relationship to a faucet 11 on the outside of the wall 12 of a house. The faucet 11 may be of any standard type and, as shown, it includes an externally threaded outlet portion 13 for receiving a fitting 14 at the end of a conventional garden hose 15. The faucet 11 also includes an internal valve which is controlled by an outwardly projecting horizontal rotatable shaft 16 and, as shown in FIGS. 1 and 2, a handle 18 is secured to the end of the shaft 16 by a screw 19.

The device 10 includes an elongated extension member 20 which as illustrated may be formed by two parts 21 and 22, the part 22 being telescopically slidable within the part 21 so as to allow adjustment of the overall length of the member 20 and a set screw 23 being provided for fixing the length of the member 20 once the desired length is obtained.

At the outer end of the extension member 20, a handle 24 is provided which is in the form of a rod on an axis transverse to the axis of the member 20, the rod 24 having a central portion 25 extending through the part 22 of member 20 adjacent the outer end thereof. As illustrated, the outer part 22 may be hollow and a plug 26 may be inserted in the outer end thereof.

An elongated support member 28 is provided which, as illustrated, is formed by a lower part 29 and an upper part 30, the lower part 29 being hollow to telescopically receive the part 30 so as to allow vertical adjustment and a set screw 31 being provided for fixing the length when adjusted. The part 29 has a lower pointed end 32 so that it can be readily driven into the ground.

The upper part 30 of the support member 28 has an upper end portion 34 of circular shape for receiving the outer part 21 of the extension member 20, so as to support and journal the extension member 20.

Connection means are provided at the inner end of the inner part 21 of the extension member 20 for connection to the faucet shaft 16. In the arrangement as illustrated in FIGS. 1 and 2, the connection means includes a member 36 which includes a shank portion 37 adapted to be inserted into the inner end of the inner part 21 of the extension member 20, a locking pin 38 being provided for extending through aligned openings in the wall of the part 21 and through an opening 39 in the shank portion 37. The part 36 further includes a plate portion 40 projecting in diametrically opposite direction from the axis of the member 20 and having openings 41 and 42 therethrough. A pair of screws 43 and 44 are provided having shank portions for extending through the openings 41 and 42 and through openings 45 and 46 in the handle 18 with nuts 47 and 48 being threaded on the ends of the shank portions of the screws 43 and 44. Thus, the inner end of the member 20 may be securely and permanently locked to the handle 18. In the alternative, the screws 43 and 44 may be positioned with the heads thereof on the inside of the handle 18 and with the nuts 47 and 48 on the outside of the handle 18 to lock the screws 43 and 44 thereto and to provide outwardly projecting end portions of the screws for positioning in the openings 41 and 42 of the plate portion 40. Thus, the device 10 may be readily installed or removed, as desired.

FIG. 3 illustrates a modified form of connecting member which is designated by reference numeral 50 and which includes a shank portion 51 corresponding to the shank portion 37 of member 36 so that it can be secured to the inner end of the extension member 20. The member 50 includes a head portion 52 which includes a recess 53 shaped to receive the handle 18, arcuately spaced inwardly projecting portions 54 being provided for extending radially inwardly between the conventional lobe portions such as provided in the illustrated type of disk handle 18. With the member 50, there is no permanent connection, and the device 10 may be readily installed and removed, as desired.

FIG. 4 illustrates another type of connecting member generally designated by a reference numeral 56 and including a shank portion 57 corresponding to shank portions 37 and 51, for connection to the inner end of the extension member 20. The connecting member 56 includes a head portion 58 formed with a socket 59 of polygonal shape, the illustrated socket 59 being square and being arranged to receive the end of a faucet shaft which is of a type including a square end. The member 56 permits installation or removal of the device 10, as desired.

FIG. 5 illustrates a modified form of connecting member which is generally designated by reference numeral 60 and which includes a shank portion 61 and a plate portion 62, respectively, corresponding to the shank portion 37 and plate portion 40 of the member 36. In addition, the member 60 includes a second shank portion 63 which is adapted to be inserted into the end of the part 21 of the extension member 20 to be connected thereto through the pin 38. The shank portions 61 and 63 are interconnected through a universal joint arrangement including cross pins 64 and 65. With this arrangement, the axis of the extension member 20 can be at a substantial angle to the axis of the valve-operating shaft 16.

FIG. 6 illustrates a modified form of extension member 68 which includes a hollow tubular part 69 corresponding to the part 21 of the extension member 20 and a second tubular part 70 corresponding to the part 22 of the member 20 but having inside and outside diameters which are the same as those of the part 69. The parts 69 and 70 are interconnected through a connector member 72 having openings 73 and 74 arranged to receive pins 75 and 76. The outer end of the part 70 may receive the handle member 24. With this type of arrangement, a number of sections or parts such as parts 69 and 70 may be provided each having a certain length and the overall length of the extension member may be adjusted by selecting the required number of sections or parts.

The invention thus provides a simple device which permits operation of a faucet from a point outside bushes and shrubbery, the device being readily installed.

It will be understood that modifications and variations may be effected without departing from the spirit and scope of the novel concepts of this invention.

What is claimed is:

1. A device for use with a faucet on the outside of a house and having an externally threaded outlet portion for attachment to a fitting at the end of a garden hose and a valve controlled by an outwardly projecting generally horizontal rotatable shaft, said device comprising: an elongated extension member for extending generally horizontally in axial alignment with said shaft from an inner end adjacent the faucet to an outer end spaced a substantial distance therefrom, handle means on the outer end of said extension member for engagement by the hand of a user to effect rotation of said extension member, connection means secured to said inner end of said extension member and arranged for connection to said shaft to effect rotation of said shaft upon rotation of said extension member, an elongated support member arranged to extend vertically from a lower end adapted to be driven into the ground to an upper end adjacent said outer end of said extension member, and journaling means on said upper end of said support member for supporting and journaling said outer end of said extension member.

2. In a device as claimed in claim 1, the length of said support member being adjustable to facilitate alignment of said journaling means with the axis of said rotatable shaft of said faucet.

3. In a device as defined in claim 1, the length of said extension member being adjustable.

4. In a device as defined in claim 1, for use with a faucet which includes a handle secured to the said rotatable shaft, said faucet handle being in the form of a flat disk, said connection means including a pair of screws disposed in spaced relationship to and on opposite sides of the axis of said extension member and adapted to extend through portions of said disk on opposite sides of the axis of said rotatable shaft of said faucet.

5. In a device as defined in claim 1, wherein said rotatable shaft of said faucet has an outer end of polygonal shape, said connection means including a member having a socket arranged to receive said polygonally shaped end of said rotatable shaft of said faucet.

6. In a device as defined in claim 1, said connection means including a universal joint arrangement for permitting the axis of said extension member to be at a substantial angle to the axis of said shaft of said faucet.

7. In a device as defined in claim 1, for use with a faucet which includes a handle secured to the said rotatable shaft, said faucet handle being in the form of a flat disk, said disk having a plurality of angularly spaced lobes on the outer periphery thereof, said connection means comprising a member having a recess for receiving said disk and including radially inwardly projecting portions for extending between said lobes of said disk to provide coupling thereto.

* * * * *